United States Patent
Mukadeyama et al.

(10) Patent No.: US 12,210,181 B2
(45) Date of Patent: Jan. 28, 2025

(54) LIGHT GUIDE MEMBER FOR LIGHTING DEVICE AND LIGHTING DEVICE

(71) Applicant: NITTO DENKO CORPORATION, Osaka (JP)

(72) Inventors: Shimpei Mukadeyama, Osaka (JP); Takahiro Yoshikawa, Osaka (JP); Kozo Nakamura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/570,874

(22) PCT Filed: Jun. 10, 2022

(86) PCT No.: PCT/JP2022/023417
§ 371 (c)(1),
(2) Date: Dec. 15, 2023

(87) PCT Pub. No.: WO2022/264930
PCT Pub. Date: Dec. 22, 2022

(65) Prior Publication Data
US 2024/0219620 A1   Jul. 4, 2024

(30) Foreign Application Priority Data

Jun. 17, 2021 (JP) .................. 2021-100994

(51) Int. Cl.
*F21V 8/00* (2006.01)
(52) U.S. Cl.
CPC ................. *G02B 6/0036* (2013.01)
(58) Field of Classification Search
CPC .......... G02B 6/0033–0043; G02B 6/005–0061
See application file for complete search history.

(56) References Cited

U.S. PATENT DOCUMENTS 6,196,692 B1   3/2001   Umemoto et al.
6,896,386 B2 *  5/2005   Kitazawa ............. G02B 6/0016
                                                    362/330

(Continued)

FOREIGN PATENT DOCUMENTS

JP   2000-48617    2/2000
JP   2007-200768   8/2007

(Continued)

OTHER PUBLICATIONS

International Search Report issued in International Patent Application No. PCT/JP2022/023417, dated Aug. 9, 2022.

(Continued)

*Primary Examiner* — Jason M Han
(74) *Attorney, Agent, or Firm* — GREENBLUM & BERNSTEIN, P.L.C.

(57) ABSTRACT

A lightguide component for illumination devices having an exit surface includes: a lightguide layer having a light-receiving portion to receive light emitted from a light source, a first principal face at the exit surface side, and a second principal face at an opposite side from the first principal face; a light distribution controlling structure having a plurality of internal spaces, each of the plurality of internal spaces including a first slope to direct a portion of light propagating in the lightguide layer toward the exit surface via total internal reflection, and a second slope at an opposite side from the first slope, wherein, when viewed from a normal direction of the first principal face of the lightguide layer, the first slope presents a curved surface that is convex toward the light source; and an anti-reflection layer and/or anti-glare layer disposed at the first principal face side of the lightguide layer.

13 Claims, 11 Drawing Sheets

(56) References Cited

U.S. PATENT DOCUMENTS

| | | | |
|---|---|---|---|
| 2002/0122257 A1* | 9/2002 | Suga | G02B 5/0268 |
| | | | 349/137 |
| 2012/0307179 A1 | 12/2012 | Nishimura et al. | |
| 2013/0063955 A1 | 3/2013 | Rinko | |
| 2020/0257044 A1 | 8/2020 | Rinko | |
| 2020/0348462 A1 | 11/2020 | Hattori et al. | |
| 2021/0109274 A1 | 4/2021 | Rinko et al. | |
| 2021/0148545 A1* | 5/2021 | Kim | F21V 7/0091 |

FOREIGN PATENT DOCUMENTS

| | | |
|---|---|---|
| JP | 2011-133879 | 7/2011 |
| JP | 2011232717 A * | 11/2011 |
| JP | 2013-197065 | 9/2013 |
| WO | 2011/124765 | 10/2011 |
| WO | 2019/087118 | 5/2019 |
| WO | 2019/102959 | 5/2019 |
| WO | 2019/146628 | 8/2019 |
| WO | 2019/182091 | 9/2019 |

OTHER PUBLICATIONS

Written Opinion issued in International Patent Application No. PCT/JP2022/023417, dated Aug. 9, 2022.

* cited by examiner

LIGHT GUIDE MEMBER FOR LIGHTING DEVICE AND LIGHTING DEVICE

TECHNICAL FIELD

The present invention relates to: lightguide components for illumination devices; and illumination devices, and more particularly to: sheet-shaped lightguide components for illumination devices having a light source and a lightguide layer; and illumination devices. It is meant herein that being "sheet-shaped" is inclusive of being plate-shaped or film-shaped, irrespective of the rigidity (softness) and thickness of the sheet. Note that a sheet-shaped illumination device may be used in various forms, e.g., in roll form.

BACKGROUND ART

Sheet-shaped illumination devices that include a light source and a lightguide layer are used in backlights or frontlights of liquid crystal display devices, for example. In recent years, use of next-generation solid state lighting (SSL), such as LED illumination, has been promoted. For example, lighting with good design or fun, called architainment lighting, has been proposed that is based on e.g. combinations of a construction component and an illumination device.

For example, Patent Document 1 discloses a one-side illumination-cum-window having a light source at an end of a plate-shaped transparent base, such that, for illumination at night, the one-side illumination-cum-window functions as an illumination device allowing light that has been emitted from the light source and guided in the transparent base to be output through one surface of the transparent base, and for non-illumination during day, the one-side illumination-cum-window functions as a transparent window. Patent Documents 2 to 5 disclose sheet-shaped illumination device having light distribution structures which utilize total reflection at interfaces between air cavities (internal spaces). The entire disclosure of Patent Documents 2 to 5 is incorporated herein by reference.

CITATION LIST

Patent Literature

[Patent Document 1] International Publication No. 2019/102959
[Patent Document 2] International Publication No. 2019/182091
[Patent Document 3] International Publication No. 2019/146628
[Patent Document 4] International Publication No. 2011/124765
[Patent Document 5] International Publication No. 2019/087118

SUMMARY OF INVENTION

Technical Problem

The present invention aims to provide, from practicality and design standpoints, a lightguide component for illumination devices and an illumination device which emit light through one of two principal faces that are oriented in opposite directions from each other and which appear transparent when seen through the other principal face.

Solution to Problem

According to embodiments of the present invention, means for solution as recited in the following Items are provided.

[Item 1]
A lightguide component for illumination devices having an exit surface, the lightguide component comprising:
  a lightguide layer having a light-receiving portion to receive light emitted from a light source, a first principal face at the exit surface side, and a second principal face at an opposite side from the first principal face;
  a light distribution controlling structure having a plurality of internal spaces, each of the plurality of internal spaces including a first slope to direct a portion of light propagating in the lightguide layer toward the exit surface via total internal reflection, and a second slope at an opposite side from the first slope, wherein, when viewed from a normal direction of the first principal face of the lightguide layer, the first slope presents a curved surface that is convex toward the light source; and
  an anti-reflection layer and/or anti-glare layer disposed at the first principal face side of the lightguide layer.

[Item 2]
The lightguide component for illumination devices of Item 1, wherein the plurality of internal spaces are disposed discretely along a light-guiding direction of the lightguide layer and along a direction that intersects the light-guiding direction.

[Item 3]
The lightguide component for illumination devices of Item 1 or 2, comprising an anti-reflection layer disposed at the first principal face side of the lightguide layer, wherein
  the anti-reflection layer includes a multilayer stack that is composed of a single dielectric layer having a lower refractive index than a refractive index of the lightguide layer or a plurality of dielectric layers of respectively different refractive indices.

[Item 4]
The lightguide component for illumination devices of Item 1 or 2, comprising an anti-reflection layer disposed at the first principal face side of the lightguide layer, wherein
  the anti-reflection layer has a moth-eye structure or is made of a material having voids.

[Item 5]
The lightguide component for illumination devices of any one of Items 1 to 4, comprising an anti-glare layer disposed at the first principal face side of the lightguide layer, wherein
  a surface of the anti-glare layer at an opposite side from the lightguide layer has a mean roughness Ra of not less than 0.8 µm and not more than 1000 µm and a maximum height Rz of 0 µm and not more than 1000 µm.

[Item 6]
The lightguide component for illumination devices of any one of Items 1 to 5, wherein,
  a sloping angle $\theta a$ of the first slope is not less than 10° and not more than 70°; and
  a sloping angle $\theta b$ of the second slope is not less than 50° and not more than 100°.

[Item 7]
The lightguide component for illumination devices of any one of Items 1 to 6, wherein the light distribution controlling structure is formed on a redirection layer that is disposed at the first principal face side or the second principal face side of the lightguide layer.

[Item 8]

The lightguide component for illumination devices of any one of Items 1 to 7, wherein, when the lightguide component is viewed from the normal direction of the first principal face of the lightguide layer, a ratio of an area of the plurality of internal spaces to an area of the lightguide layer is 80% or less.

[Item 9]

The lightguide component for illumination devices of any one of Items 1 to 8, comprising a low-refractive index layer at the second principal face side of the lightguide layer, the low-refractive index layer having a lower refractive index than a refractive index of the lightguide layer.

[Item 10]

The lightguide component for illumination devices of any one of Items 1 to 9, wherein a maximum contrast ratio in luminance is 1.1 or less in a square region that is located at an arbitrary position in a region through which light leaks from a rear face that is disposed at the second principal face side of the lightguide component for illumination devices, one side of the square region being 17.3 mm.

[Item 11]

The lightguide component for illumination devices of any one of Items 1 to 10, wherein a visible light transmittance of 60% or more and a haze value of less than 30%.

[Item 12]

An illumination device comprising:
the lightguide component for illumination devices of any one of Items 1 to 11; and
a light source to emit light toward the light-receiving portion.

[Item 13]

The illumination device of Item 12, wherein the light source includes a plurality of LED devices arranged along the light-receiving portion of the lightguide layer.

Advantageous Effects of Invention

According to an embodiment of the present invention, there is provided a lightguide component for illumination devices and an illumination device which emit light through one of two principal faces that are oriented in opposite directions from each other and which appear transparent when seen through the other principal face. A lightguide component for illumination devices and an illumination device according to a certain embodiment have a visible light transmittance of 60% or more and a haze value of less than 30%.

DESCRIPTION OF EMBODIMENTS

Hereinafter, with reference to the drawings, a lightguide component for illumination devices and an illumination device according to embodiments of the present invention will be described. Lightguide components for illumination devices and illumination devices according to embodiments of the present invention are not limited to those exemplified below.

Figure 1:
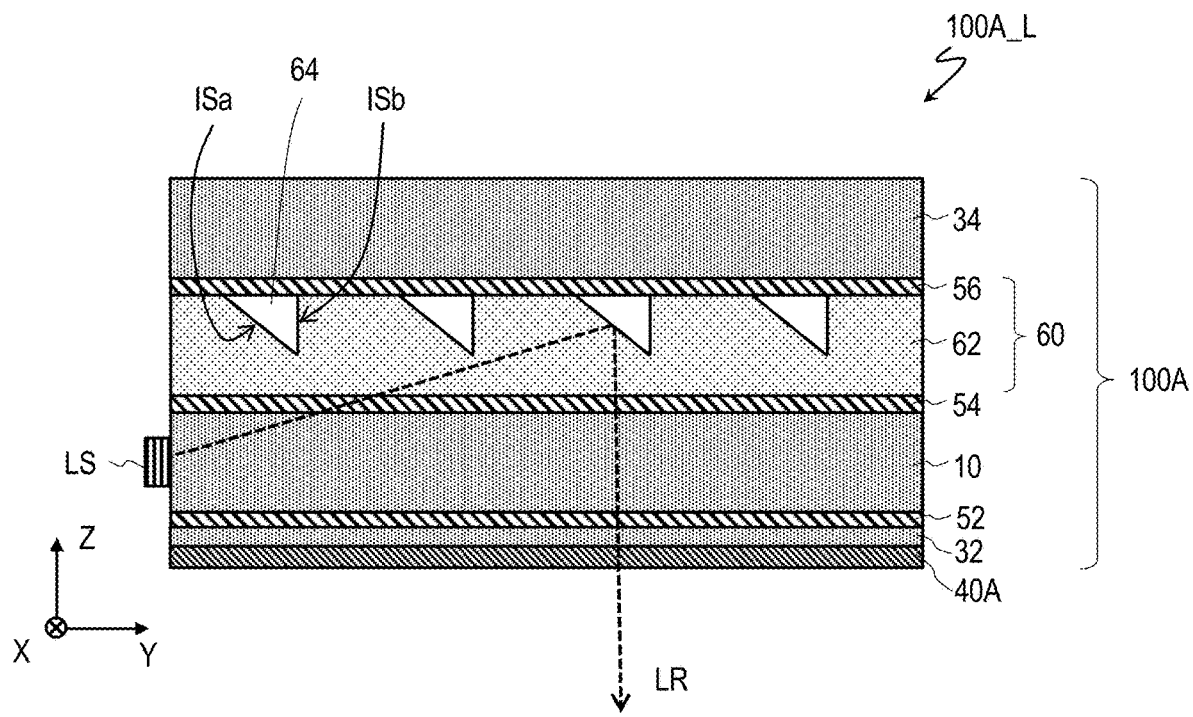
FIG. 1 A schematic cross-sectional view of an illumination device 100A_L according to an embodiment of the present invention.

FIG. 1 shows a schematic cross-sectional view of an illumination device 100A_L according to an embodiment of the present invention. The illumination device 100A_L is a sheet-shaped illumination device having an exit surface (lower in FIG. 1) through which light LR is emitted and a rear face (upper in FIG. 1) at an opposite side from the exit surface. Light LR is emitted in the −Z direction in FIG. 1.

The illumination device 100A_L includes: a light source LS; and a lightguide component 100A that receives light emitted from the light source LS and allows the light to propagate in the Y direction and be emitted in the −z direction. The lightguide component 100A includes: a light-receiving portion (e.g., a light-receiving side face of the lightguide layer 10 that is closer to the light source LS) to receive the light emitted from the light source LS; a lightguide layer 10 having a first principal face at the exit surface side and a second principal face at an opposite side from the first principal face; a light distribution controlling structure having a plurality of internal spaces 64; and an anti-reflection layer 40A that is disposed at the first principal face side of the lightguide layer 10 via an adhesive layer 52 and a base layer 32. In the production of the lightguide component 100A, the base layer 32 having the anti-reflection layer 40 formed thereon is disposed at the first principal face side of the lightguide layer 10 via the adhesive layer 52. The exit surface of the illumination device 100A_L is a surface of the anti-reflection layer 40A at an opposite side from the lightguide layer 10.

Each of the plurality of internal spaces 64 includes: a first slope ISa to direct a portion of light propagating in the lightguide layer 10 toward the exit surface via total internal reflection (TIR); and a second slope ISb at an opposite side from the first slope ISa. The anti-reflection layer 40A includes a multilayer stack that is composed of a single dielectric layer having a lower refractive index than the refractive index of the lightguide layer 10, or of a plurality of dielectric layers of respectively different refractive indices. The anti-reflection layer 40A restrains light having been directed toward the exit surface from undergoing Fresnel reflection at an interface between the base layer 32 and the anti-reflection layer 40A so as to be directed toward the rear face. The anti-reflection layer 40A suppresses Fresnel reflectance to 3% or less. The light LR emitted from the exit surface is light which has been emitted from the light source LS, propagated through the lightguide layer 10, undergone total internal reflection at the first slope ISa of an internal space 64, and passed through the lightguide layer 10, the base layer 32, and the anti-reflection layer 40A. It will be appreciated that, when passing through the interface, the light LR may be refracted in accordance with the refractive index of the substance composing the interface.

In the lightguide component 100A, the light distribution controlling structure having the plurality of internal spaces 64 is formed in a redirection layer 60 that is disposed via the adhesive layer 54 at the second principal face side of the lightguide layer 10. The redirection layer 60 having the plurality of internal spaces 64 is constituted by the adhesive layer 56 and a textured film 62 having recesses 64 (indicated by the same reference numeral as the internal spaces 64) on its surface. The plurality of internal spaces 64 may be formed in the lightguide layer 10. A redirection layer may be formed at the first principal face side of the lightguide layer 10.

The light distribution controlling structure is configured so that 80% or more of the light propagating in the lightguide layer 10 is directed toward the exit surface. Within the light propagating in the lightguide layer 10, the ratio of light to be directed toward the exit surface can be controlled by adjusting the cross-sectional shape, planar shape, size, density of placement, and distribution of the internal spaces 64. As is illustrated herein, the internal spaces 64 may have a triangular cross-sectional shape, but this is not a limitation; it may be a trapezoid or the like.

When the lightguide layer 10 is viewed from the normal direction of its principal face, the plurality of internal spaces 64 being a light distribution controlling structure are such that: a ratio of the area of the plurality of internal spaces 64 to the area of the lightguide layer 10 (occupied area percentage) is preferably not less than 1% and not more than 80%, and its upper limit value is more preferably 50% or less, and still more preferably 45% or less; in order to obtain a high transmittance and/or a low haze value, it is preferably 30% or less, still more preferably 10% or less, and still more preferably 5% or less. For example, when the internal spaces have an occupied area percentage of 50%, a haze value of 30% can be obtained. Note that the occupied area percentage of the internal spaces 64 may be uniform; or, in order to prevent a decrease in luminance with increasing distance from the light source LS, the occupied area percentage may be allowed to increase with increasing distance. In order to enable mass production by a roll-to-roll method or a roll-to-sheet method, the occupied area percentage of the internal spaces 64 is preferably uniform.

In the lightguide component 100A, the base layer 32 is bonded to the first principal face of the lightguide layer 10 via the adhesive layer 52, and the textured film 62 is bonded to the second principal face of the lightguide layer 10 via the adhesive layer 54. Also, in the lightguide component 100A, the adhesive layer 56 (which constitutes the redirection layer 60 together with the textured film 62) causes the base layer 34 and the textured film 62 to be bonded together. The lightguide layer 10 and the base layers 32 and 34 may be transparent substrates or films. In the lightguide component 100A, the refractive indices of the base layer 32, the adhesive layer 52, the lightguide layer 10, the adhesive layer 54, and the textured film 62 are designed to be essentially equal, whereby light having been directed toward the exit surface can be restrained from undergoing Fresnel reflection at the interfaces of these component elements. Preferable configurations for the lightguide layer 10, the base layers 32 and 34, the anti-reflection layer 40A, the textured film 62, and the adhesive layers 52, 54 and 56 will be described later.

The lightguide component 100A_L may be characterized by a visible light transmittance of 60% or more and a haze value of less than 30%, for example. The visible light transmittance is preferably 70% or more, and still more preferably 80% or more. The haze value is preferably less than 10%, and still more preferably 5% or less. Because the lightguide component 100A of according to an embodiment of the present invention has a high visible light transmittance and a low haze value, it is possible to see an object (indication) through the lightguide component 100A. It is assumed herein that light having a wavelength of not less than 380 nm and not more than 780 nm is visible light. The visible light transmittance and the haze value can be measured by using a haze meter (manufactured by MURAKAMI COLOR RESEARCH LABORATORY CO., LTD.: product name HM-150), for example.

Figure 2:
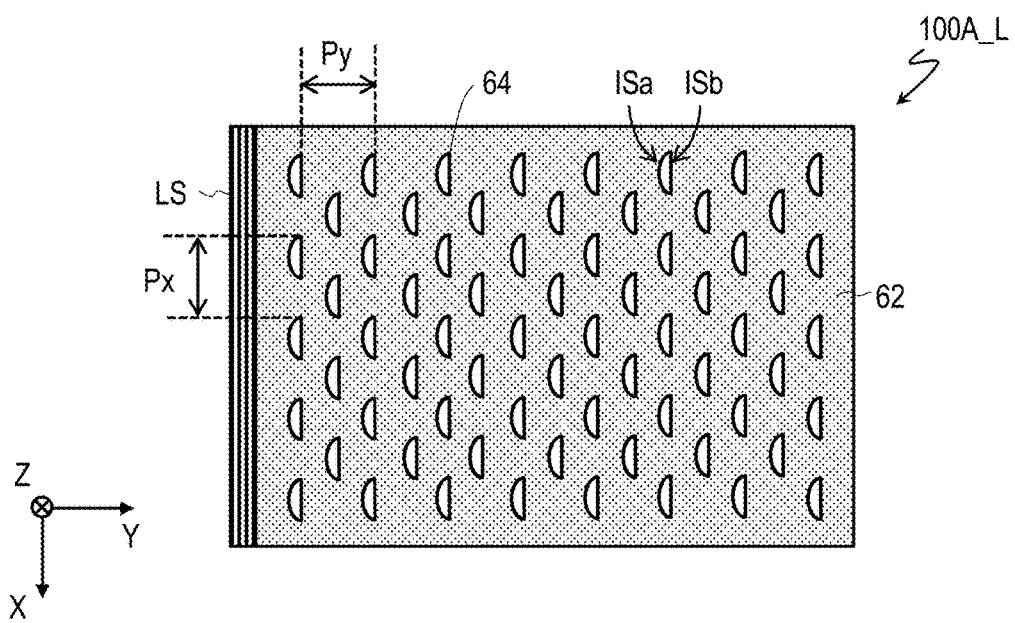
FIG. 2 A schematic plan view of the illumination device 100A_L.

Next, with reference to FIG. 2, examples of the planar shape and placement of the internal spaces 64 will be described. FIG. 2 shows a schematic plan view of the illumination device 100A_L.

As shown in FIG. 2, the plurality of internal spaces 64 are disposed discretely along a light-guiding direction (the Y direction) of the lightguide layer 10 and along a direction (the X direction) that is orthogonal to the light-guiding direction, for example. As for the size (length L, width W: see FIG. 3A and FIG. 3B) of the internal spaces 64, their length L is preferably not less than 10 µm and not more than 500 µm and their width W is preferably not less than 1 µm and not more than 100 µm, for example. From the standpoint of light extraction efficiency, their height H (see FIG. 3A) is preferably not less than 1 µm and not more than 100 µm.

Although an example is illustrated herein where the plurality of internal spaces 64 are disposed discretely along the light-guiding direction (the Y direction) of the lightguide layer 10 and along a direction (the X direction) that is orthogonal to the light-guiding direction, this is not a limitation; the plurality of internal spaces 64 may be disposed discretely along the light-guiding direction (the Y direction) of the lightguide layer 10 and along any direction that intersects the light-guiding direction. The discrete placement of the internal spaces 64 may be set as appropriate, in accordance with the shape of the lightguide layer 10, required intensity distribution, etc. Although light may propagate in various directions within the lightguide layer 10, the Y direction will be referred to as the light-guiding direction, whereas light having a (non-zero) component in the Y direction will be said to be propagating in the Y direction. The same is also true of any other direction. In other words, light propagating in the −Y direction encompasses all light that has a (non-zero) component in the −Y direction.

The plurality of internal spaces 64 are disposed discretely along the light-guiding direction and along a direction that intersects the light-guiding direction, for example. A discrete placement may have periodicity (regularity) along at least one direction, or may not have any regularity. However, from a mass producibility standpoint, it is preferable that the plurality of internal spaces 64 are disposed uniformly. For example, in the example shown in FIG. 2, a plurality of internal spaces 64 having a curved surface of a substantially identical shape, which is convex in an identical direction, are disposed discretely and periodically along a light-guiding direction of the lightguide layer 10 (the Y direction) and a direction (the X direction) that is orthogonal to the light-guiding direction, across the entire area. In this case, a pitch Px is preferably e.g. not less than 10 μm and not more than 500 μm, and a pitch Py is preferably e.g. not less than 10 μm and not more than 500 μm. In the example shown in FIG. 2, a number of internal spaces 64 are disposed with a ½ pitch shift in each of the Y direction and the X direction. In Examples 1 to 4 to be described later, Px is 200 μm and Py is 100 μm.

As shown in FIG. 2, when viewed from the normal direction of the first principal face of the lightguide layer 10, the first slope ISa presents a curved surface that is convex toward the light source LS. The light source LS is may be, for example, LED devices, such that a plurality of LED devices are arranged along the X direction in a manner of following along the light-receiving portion of the lightguide layer 10. Light emitted from each of the plurality of LED devices has some spread with respect to the Y direction; therefore, in order to uniformly act on light, the first slope ISa may have a curved surface that is convex toward the light source LS.

Depending on the application, the lightguide layer 10 may have two light-receiving portions that are located on opposite sides from each other, with the light source LS being disposed on one light-receiving portion and another light source being disposed on the other light-receiving portion. The light distribution controlling structure may include internal spaces 64 with a curved surface that is convex toward the light source LS but not any internal spaces with a curved surface that is convex toward the other light source. Alternatively, the light distribution controlling structure may include internal spaces 64 with a curved surface that is convex toward the light source LS and also other internal spaces with a curved surface that is convex toward the other light source. The two kinds of internal spaces with curved surfaces that are convex toward opposite sides from each other may be mixedly present within the light distribution controlling structure, or disposed in isolation.

Figure 3A:
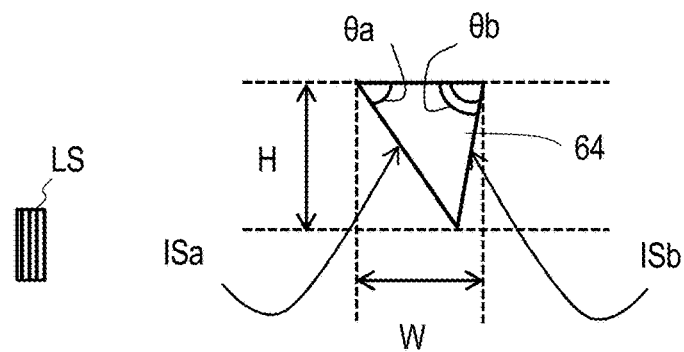
FIG. 3A A schematic cross-sectional view of an internal space 64 that the illumination device 100A_L may include.
Figure 3B:
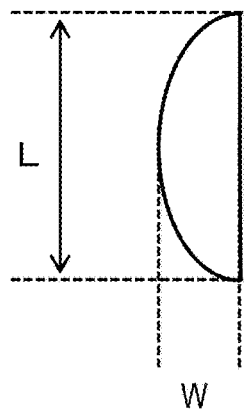
FIG. 3B A schematic plan view of an internal space 64.

Next, with reference to FIG. 3A, FIG. 3B and FIG. 3C, the shape of an internal space 64 will be described. FIG. 3A shows a schematic cross-sectional view of an internal space 64; FIG. 3B shows a schematic plan view of an internal space 64; and FIG. 3C shows a schematic plan view of a variation of an internal space 64.

As shown in FIG. 3A, a cross-sectional shape of an internal space 64 is, for example, a triangle. When the sloping angle θa of the first slope ISa and the sloping angle θb of the second slope ISb are in the following ranges, 80% or more of the light propagating in the lightguide layer 10 can be directed toward the exit surface. The sloping angle θa of the first slope ISa that is closer to the light source LS is e.g. not less than 10° and not more than 70°. When the sloping angle θa is less than 10°, the light extraction efficiency may decrease. On the other hand, when the sloping angle θa exceeds 70°, processing may be difficult. The sloping angle θb of the second slope ISb is e.g. not less than 50° and not more than 100°. When the sloping angle θb is less than 50°, stray light may occur in unintended directions. On the other hand, when the sloping angle θb exceeds 100°, the amounts of light in unintended directions may also increase. Furthermore, in order to increase the amount of light LR emitted from the exit surface and decrease the amount of light emitted toward the viewer, the sloping angle θa of the first slope ISa is preferably e.g. not less than 20° and not more than 50°, and the sloping angle θb of the second slope ISb is preferably e.g. not less than 70° and not more than 90°. In Examples 1 to 4 to be described later, the sloping angle θa of the first slope ISa is 30°, and the sloping angle θb of the second slope ISb is 70°.

Figure 3C:
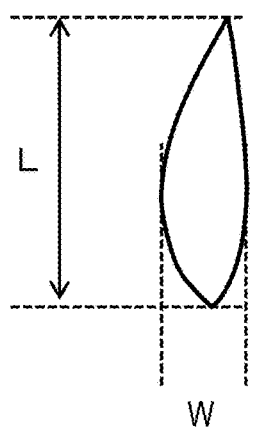
FIG. 3C A schematic plan view showing a variation of an internal space 64.

As shown in FIG. 3B and FIG. 3C, the length L of the internal space 64 is preferably not less than 10 μm and not more than 500 μm, and the width W is preferably not less than 1 μm and not more than 100 μm. The length L is e.g. more than twice the width W. The height H (see FIG. 3A) is preferably not less than 1 μm and not more than 100 μm. Depending on the machining precision of the mold when forming a textured film that includes recesses having the planar shape shown in FIG. 3B, recesses having the planar shape shown in FIG. 3C may result. Even in such a case, the length L and the width W can still characterize the planar shape of the internal space. In Examples 1 to 4 described later, the internal spaces 64 have a length L of 80 μm, a width W of 20 μm, and a height H of 10 μm.

Next, the function of the anti-reflection layer 40A in the illumination device 100A_L will be described. The anti-reflection layer 40A does more than merely allowing the light LR to be efficiently emitted from the exit surface. Before describing the function of the anti-reflection layer 40A, a problem occurring when the lightguide component 100A lacks the anti-reflection layer 40A will be described with reference to FIG. 8.

Figure 8:
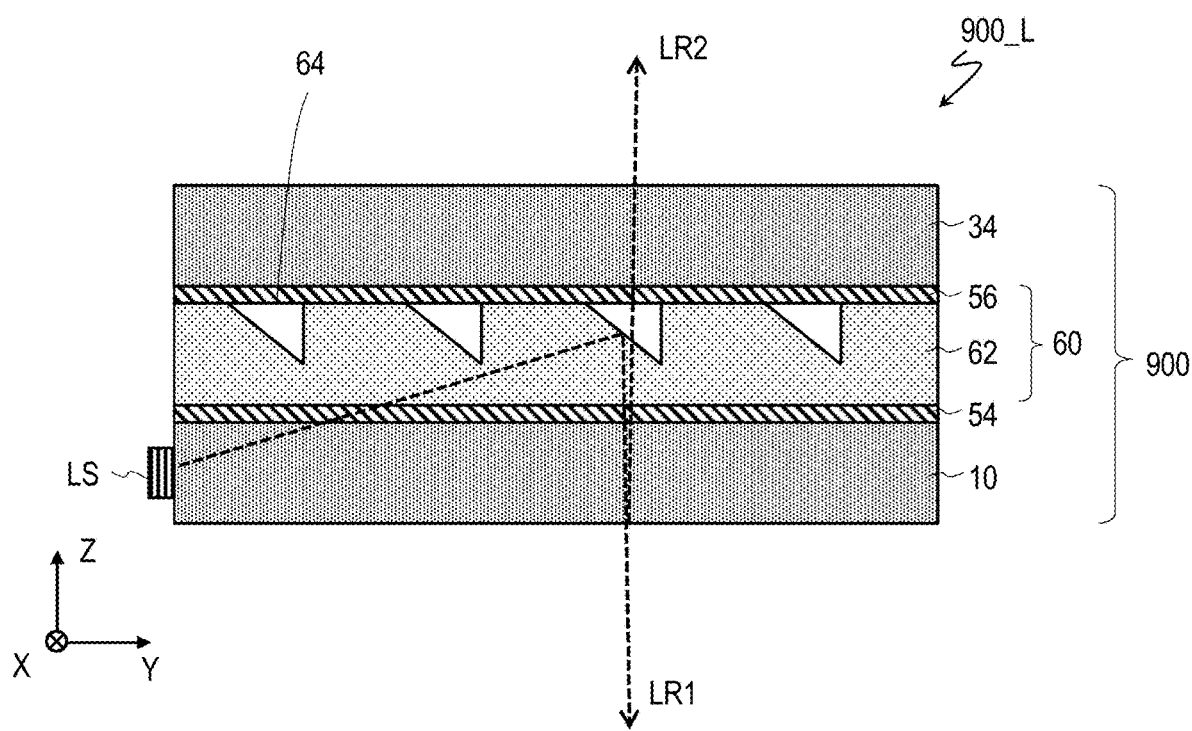
FIG. 8 A schematic cross-sectional view of an illumination device 900_L serving as Reference Example.

FIG. 8 shows a schematic cross-sectional view of an illumination device 900_L serving as Reference Example. The illumination device 900_L shown in FIG. 8 differs from the illumination device 100A_L shown in FIG. 1 in that the lightguide component 900 lacks the adhesive layer 52, the base layer 32, and the anti-reflection layer 40A. As shown in FIG. 8, within the light which has been emitted from the light source LS, propagated in the lightguide layer 10, and directed toward the exit surface by the light distribution controlling structure, a large part of light LR1 passes through the first principal face. On the other hand, 3% to 5% of light LR2 within the light having been directed toward the exit surface undergoes Fresnel reflection at the first principal face. The light LR2 having undergone Fresnel reflection enters into the internal space 64 from the first slope ISa, passes through the internal space 64, and is emitted in the Z direction from the rear face of the illumination device 900_L. The first slope ISa having a convex curved surface functions as a lens, and causes the light LR2 having passed through the first slope ISa to converge. As a result, when the illumination device 900_L is viewed from the rear face, a pattern that is ascribable to the plurality of internal spaces 64, i.e., ghosting, occurs. Ghosting detracts from the design of the illumination device 900_L when it is viewed from the rear face.

On the other hand, in the illumination device 100A_L according to an embodiment of the present invention, the anti-reflection layer 40A serves to suppress Fresnel reflection of light having been directed toward the exit surface. As a result, ghosting is suppressed when the illumination device 100A_L is viewed from the rear face, so that the illumination device 100A_L appears transparent. The anti-reflection layer 40A not only allows the light LR to be efficiently emitted from the exit surface for an improved light extraction efficiency, but also functions to improve the design of the illumination device 100A_L by suppressing ghosting when the illumination device 100A_L is viewed from the rear face.

Figure 4:
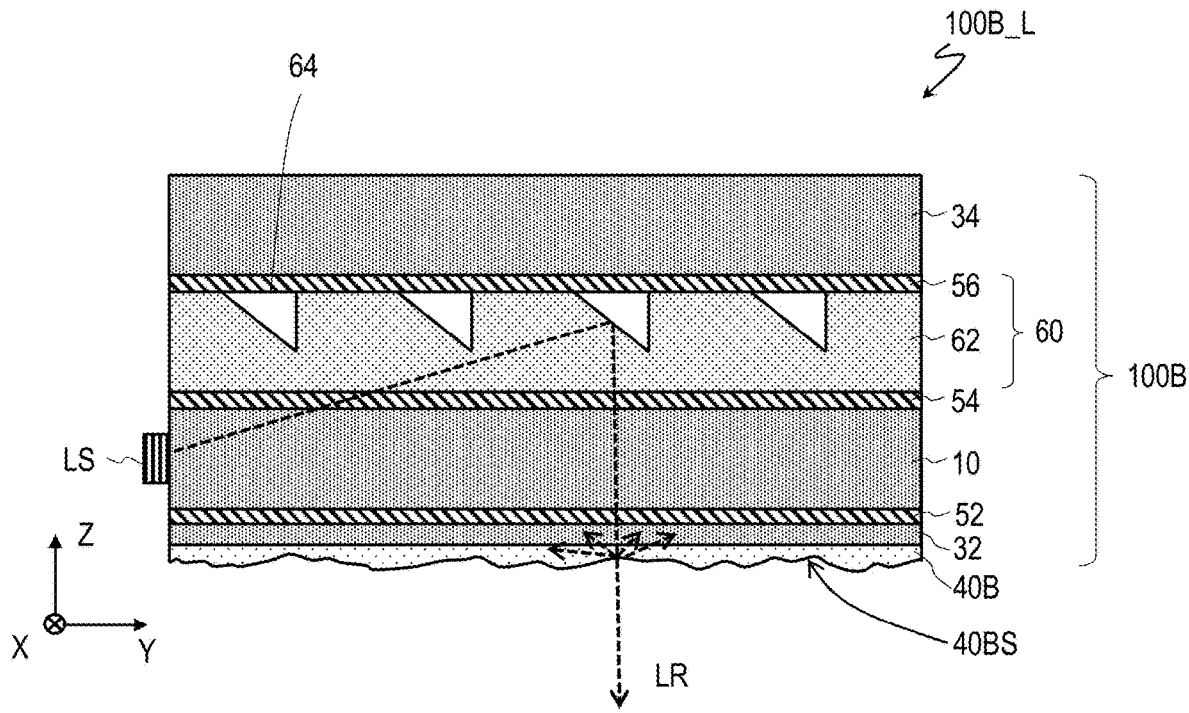
FIG. 4 A schematic cross-sectional view of an illumination device 100B_L according to another embodiment of the present invention.

Ghosting can be suppressed by means other than the anti-reflection layer 40A. Next, with reference to FIG. 4, a lightguide component for illumination devices and an illumination device according to another embodiment of the present invention will be described. FIG. 4 shows a schematic cross-sectional view of an illumination device 100B_L according to another embodiment of the present invention. As shown in FIG. 4, the illumination device 100B_L differs from the illumination device 100A_L shown in FIG. 1 in that the lightguide component 100B includes an anti-glare layer 40B instead of the anti-reflection layer 40A. Herein, differences from the illumination device 100A_L shown in FIG. 1 will mainly be described.

The anti-glare layer 40B is disposed at the first principal face side of the lightguide layer 10, and has irregular ruggednesses on a surface 40BS at an opposite side from the lightguide layer 10. The exit surface of the illumination device 100B_L is the surface 40BS of the anti-glare layer 40B. The refractive indices of the anti-glare layer 40B and the base layer 32 are designed to be essentially equal, whereby light having been directed toward the exit surface can be restrained from undergoing Fresnel reflection at an interface between the anti-glare layer 40B and the base layer 32.

Within the light having been directed toward the exit surface, the anti-glare layer 40B causes the light having been reflected at the surface 40BS to be diffused in various the directions, thereby suppressing ghosting when the illumination device 100B_L is viewed from the rear face. However, if the light that is reflected at the surface 40BS is diffused excessively, the illumination device 100B_L may become cloudy when the illumination device 100B_L is viewed from the rear face, which detracts from the design of the illumination device 100B_L. When the surface 40BS of the anti-glare layer 40B has a mean roughness Ra of not less than 0.8 µm and not more than 1000 µm and a maximum height Rz of not less than 5.0 µm and not more than 1000 µm, the ghosting when the illumination device 100B_L is viewed from the rear face can be suppressed, and the cloudiness of the illumination device 100B_L can also be suppressed. The mean roughness Ra and the maximum height Rz can be measured by using a laser microscope VK-X1000 manufactured by KEYENCE, at a ×5 magnification and in laser confocal mode, for example.

Similarly to the illumination device 100A_L shown in FIG. 1, the illumination device 100B_L shown in FIG. 4 may be characterized by a visible light transmittance of 60% or more and a haze value of less than 30%, for example.

Figure 5:
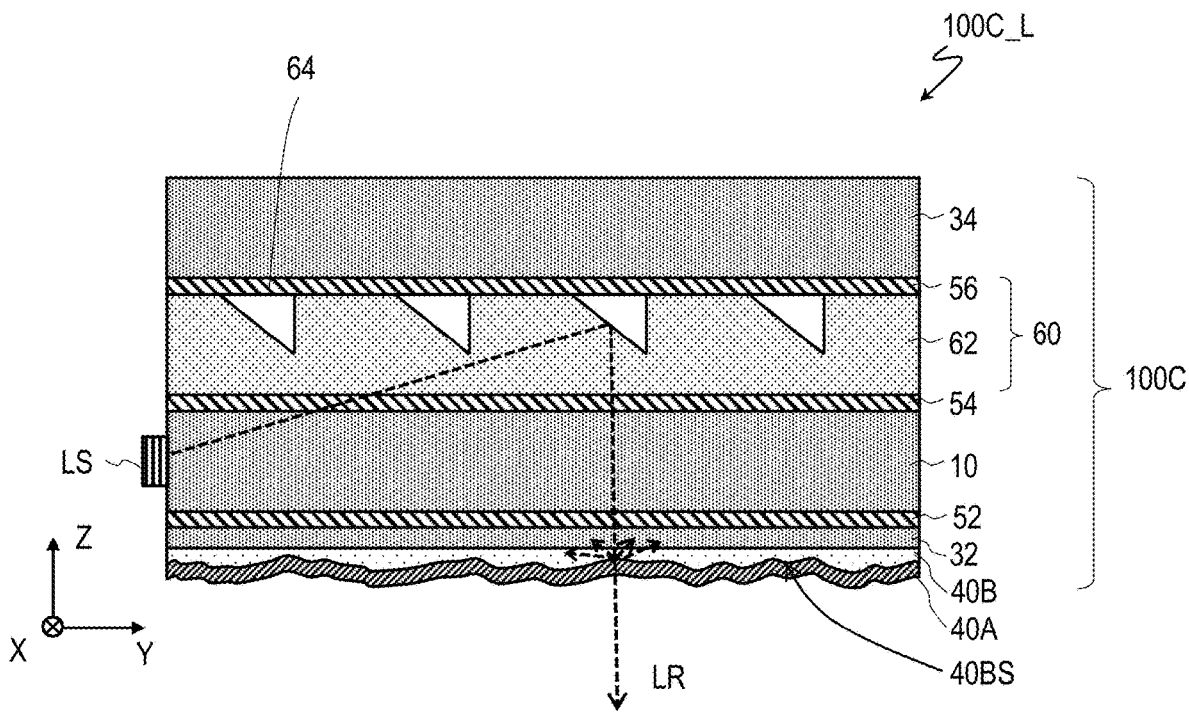
FIG. 5 A schematic cross-sectional view of an illumination device 100C_L according to still another embodiment of the present invention.

Both of the anti-reflection layer 40A and the anti-glare layer 40B may be employed to suppress ghosting. Next, with reference to FIG. 5, a lightguide component for illumination devices and an illumination device according to still another embodiment of the present invention will be described. FIG. 5 shows a schematic cross-sectional view of an illumination device 100C_L according to still another embodiment of the present invention. As shown in FIG. 5, the illumination device 100C_L differs from the illumination device 100B_L shown in FIG. 4 in that the lightguide component 100C further includes an anti-reflection layer 40A. The exit surface of the illumination device 100C_L is the surface of the anti-reflection layer 40A at an opposite side from the lightguide layer 10. Herein, differences from the illumination device 100B_L shown in FIG. 4 will mainly be described.

By disposing the anti-reflection layer 40A on the anti-glare layer 40B, light having been directed toward the exit surface can be restrained from undergoing Fresnel reflection at an interface between the anti-glare layer 40B and the anti-reflection layer 40A. Any persisting reflected light can be diffused in various directions at the surface 40BS. In the illumination device 100C_L shown in FIG. 5, as compared to the illumination device 100B_L shown in FIG. 4, not only can light LR be more efficiently emitted from the exit surface for an improved light extraction efficiency, but also ghosting can be better suppressed when the illumination device 100C_L is viewed from the rear face, thereby further improving the design of the illumination device 100C_L.

Similarly to the illumination device 100A_L shown in FIG. 1 and the illumination device 100B_L shown in FIG. 4, the illumination device 100C_L shown in FIG. 5 may be characterized by a visible light transmittance of 60% or more and a haze value of less than 30%, for example.

Although the present invention will be specifically described below by way of Examples, the present invention is not to be limited by these Examples. Unless otherwise specified, the refractive index of any component element indicated below refers to a refractive index that is measured with an ellipsometer at a wavelength of 550 nm.

Example 1

The illumination device of Example 1 has substantially the same structure as that of the illumination device 100A_L shown in FIG. 1. The light source in Example 1 includes eighteen LED devices (Nichia Corporation product No. NS2W266G-HG) being arranged at intervals of 6 mm (distance between centers of adjacent LEDs) along the light-receiving portion. The light emitted from one LED had a luminous flux of 16.3 lm (20 mA), with a light distribution angle of 120° (as defined by angles at which brightness reduces to ½ in intensity.

The lightguide component of Example 1 has a multilayer structure of anti-reflection layer/base layer/acrylic adhesive layer/acrylic plate/acrylic adhesive layer/concavo-convex textured film/polyester-based adhesive layer/PET (polyethylene terephthalate) film. The concavo-convex textured film was made of PBT. The lightguide component had a width of 120 mm and a length of 170 mm. The respective component elements of the lightguide component of Example 1, other than the base layer and the anti-reflection layer, had refractive indices and thicknesses as shown in Table 1.

TABLE 1

|  | acrylic adhesive layer | acrylic plate | acrylic adhesive layer | concavo-convex textured film | polyester-based adhesive layer | PET film |
|---|---|---|---|---|---|---|
| refractive index | 1.49 | 1.49 | 1.47 | 1.49 | 1.51 | 1.65 |
| thickness (μm) | 50 | 2000 | 50 | 130 | 7 | 38 |

In the stack composed of the base layer and the anti-reflection layer of Example 1, the base layer was a TAC (triacetyl cellulose) film, and the anti-reflection layer had a multilayer structure of hard coat layer/high-refractive index layer/low-refractive index layer in order of closeness to the TAC film. The hard coat layer was made of an acrylic; the high-refractive index layer was made of ZrO; and the low-refractive index layer was made of hollow silica. Respective component elements included in the stack composed of the base layer and the anti-reflection layer of Example 1 had refractive indices and thicknesses as shown in Table 2.

TABLE 2

|  | TAC film | hard coat layer | high-refractive index layer | low-refractive index layer |
|---|---|---|---|---|
| refractive index | 1.48 | 1.5 | 1.63 | 1.38 |
| thickness (μm) | 60 | 6.7 | 0.10 | 0.084 |

The lightguide component of Example 1 can be produced by known techniques.

Example 2

The illumination device of Example 2 is substantially identical in structure to the illumination device 100A_L shown in FIG. 1. The illumination device of Example 2 is identical in configuration to the illumination device of Example 1, except for the stack composed of the base layer and the anti-reflection layer. Within the stack composed of the base layer and the anti-reflection layer in Example 2, the base layer is a TAC film, and the anti-reflection layer has a multilayer structure of hard coat layer/low-refraction layer, in order of closeness to the TAC film. The hard coat layer was made of an acrylic, and the low-refractive index layer was made of a hollow silica. Respective component elements included in the stack composed of the base layer and the anti-reflection layer of Example 2 had refractive indices and thicknesses as shown in Table 3.

TABLE 3

|  | TAC film | hard coat layer | low-refractive index layer |
|---|---|---|---|
| refractive index | 1.48 | 1.5 | 1.38 |
| thickness (μm) | 60 | 10 | 0.084 |

The lightguide component of Example 2 can be produced by known techniques.

Example 3

The illumination device of Example 3 is substantially identical in structure to the illumination device 100B_L shown in FIG. 4. The illumination device of Example 3 is identical in configuration to the illumination device of Example 1, except for the stack composed of the base layer and the anti-glare layer. Within the stack composed of the base layer and the anti-glare layer in Example 3, the base layer is a TAC film, and the anti-glare layer is a rugged layer made of PMMA particles. The surface of the rugged layer had a mean roughness Ra of 1.2 μm and a maximum height Rz of 6.0 μm or less. The respective component elements included in the stack composed of the base layer and the anti-glare layer in Example 3 had refractive indices and thicknesses as shown in Table 4.

TABLE 4

|  | TAC film | rugged layer |
|---|---|---|
| refractive index | 1.48 | 1.5 |
| thickness (μm) | 65 | 3.3-3.4 (average value) |

The lightguide component of Example 3 can be produced by known techniques.

Example 4

The illumination device of Example 4 is substantially identical in structure to the illumination device 100C_L shown in FIG. 5. The illumination device of Example 4 is identical in configuration to the illumination device of Example 1, except for the stack composed of the base layer, the anti-glare layer, and the anti-reflection layer. Within the stack composed of the base layer, the anti-glare layer, and the anti-reflection layer in Example 4, the base layer is an acrylic film, the anti-glare layer is a rugged layer, and the anti-reflection layer is a low-refractive index layer. The rugged layer was made of PMMA particles, and the low-refractive index layer was made of hollow silica. The surface of the rugged layer had a mean roughness Ra of 0.1 μm and a maximum height Rz of 0.6 μm or less. The respective component elements included in the stack composed of the base layer, the anti-glare layer, and the anti-reflection layer in Example 4 had refractive indices and thicknesses as shown in Table 5.

TABLE 5

|  | acrylic film | rugged layer | low-refractive index layer |
|---|---|---|---|
| refractive index | 1.49 | 1.5 | 1.38 |
| thickness (μm) | 40 | 5-6 (average value) | 0.2 |

The lightguide component of Example 4 can be produced by known techniques.

Comparative Example 1

The illumination device of Comparative Example 1 differs from the illumination device of Example 1 in that it includes a PET film as the base layer and that it includes no anti-reflection layer. The PET film had a refractive index of 1.65 and a thickness of 75 μm. In the illumination device of Comparative Example 1, which lacks an anti-reflection layer, Fresnel reflection of light having been directed toward the exit surface is not suppressed.

Reference Example

The illumination device of Reference Example is substantially identical in structure to the illumination device 900_L shown in FIG. 8. The illumination device of Reference Example is configured so that the anti-reflection layer, the base layer, and the acrylic adhesive layer are removed from the first principal face side of the acrylic plate of the illumination device of Example 1.

Next, with reference to FIG. 6A to FIG. 6F, measurement results of luminance distribution, as well as the presence or absence of ghosting, at the rear face of the illumination devices of Examples 1 to 4, Comparative Example, and Reference Example will be described. Respectively for the illumination devices of Example 1 to 4, Comparative Example, and Reference Example, FIG. 6A to FIG. 6F show graphs of: (a) a luminance distribution in a rectangular region (120 mm along the width direction and 48.5 mm along the length direction) that is located in the center of the rear face; and (b) a relationship between: the position on a horizon (which is parallel to the width direction) that passes through the center of the rectangular region; and luminance.

As shown in (a) of FIG. 6A to FIG. 6D, no ghosting occurred even when the illumination devices of Examples 1 to 4 were viewed from the rear face. As shown in (b) of FIG. 6A to FIG. 6D, luminance changed gently with position. However, minute oscillations are ignored.

Figure 6A:
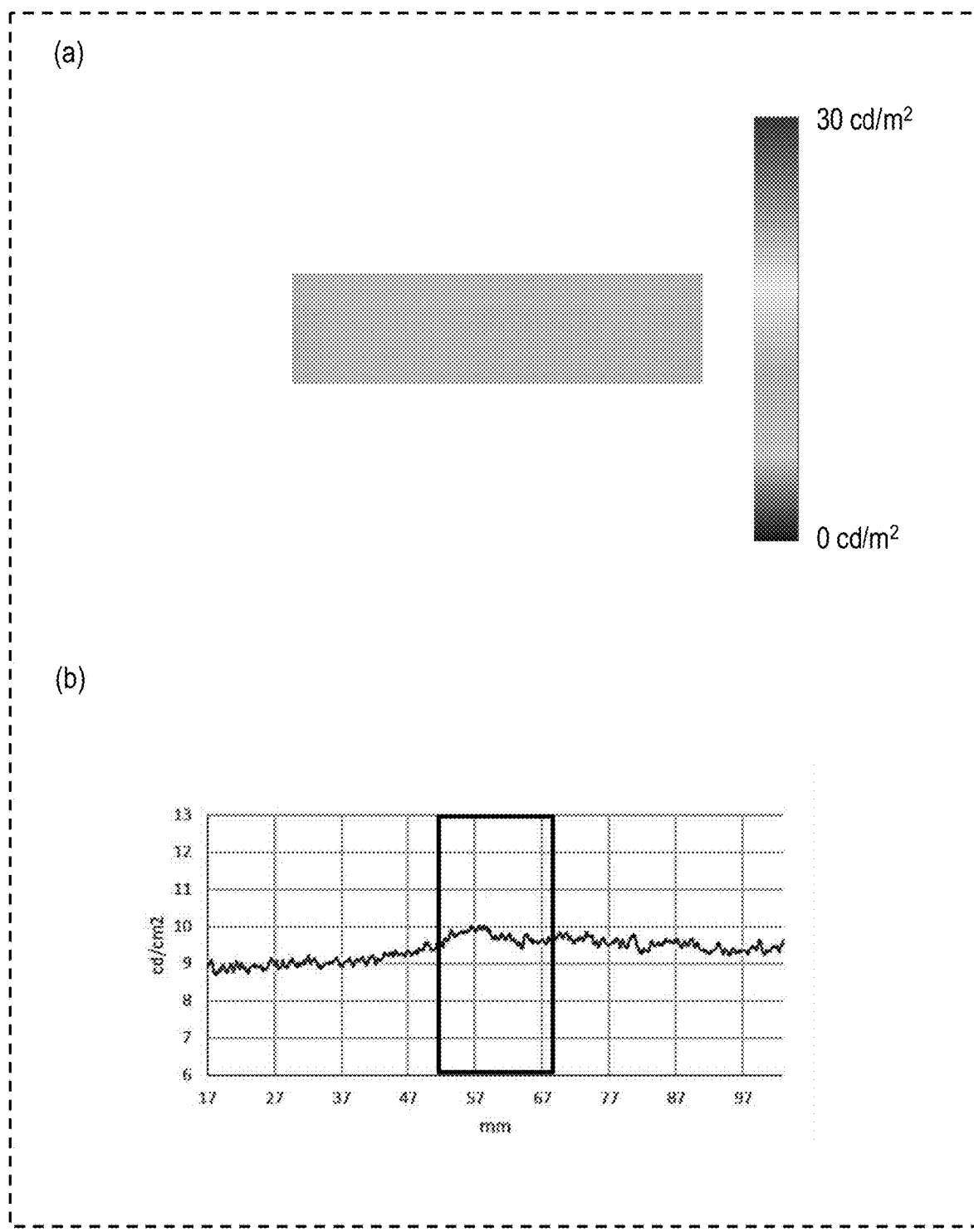
FIG. 6A A graph for an illumination device of Example 1 showing (a) a luminance distribution in a rectangular region that is located in the center of a rear face and (b) a relationship between: position on a horizon that passes through the center of the rectangular region; and luminance.
Figure 6B:
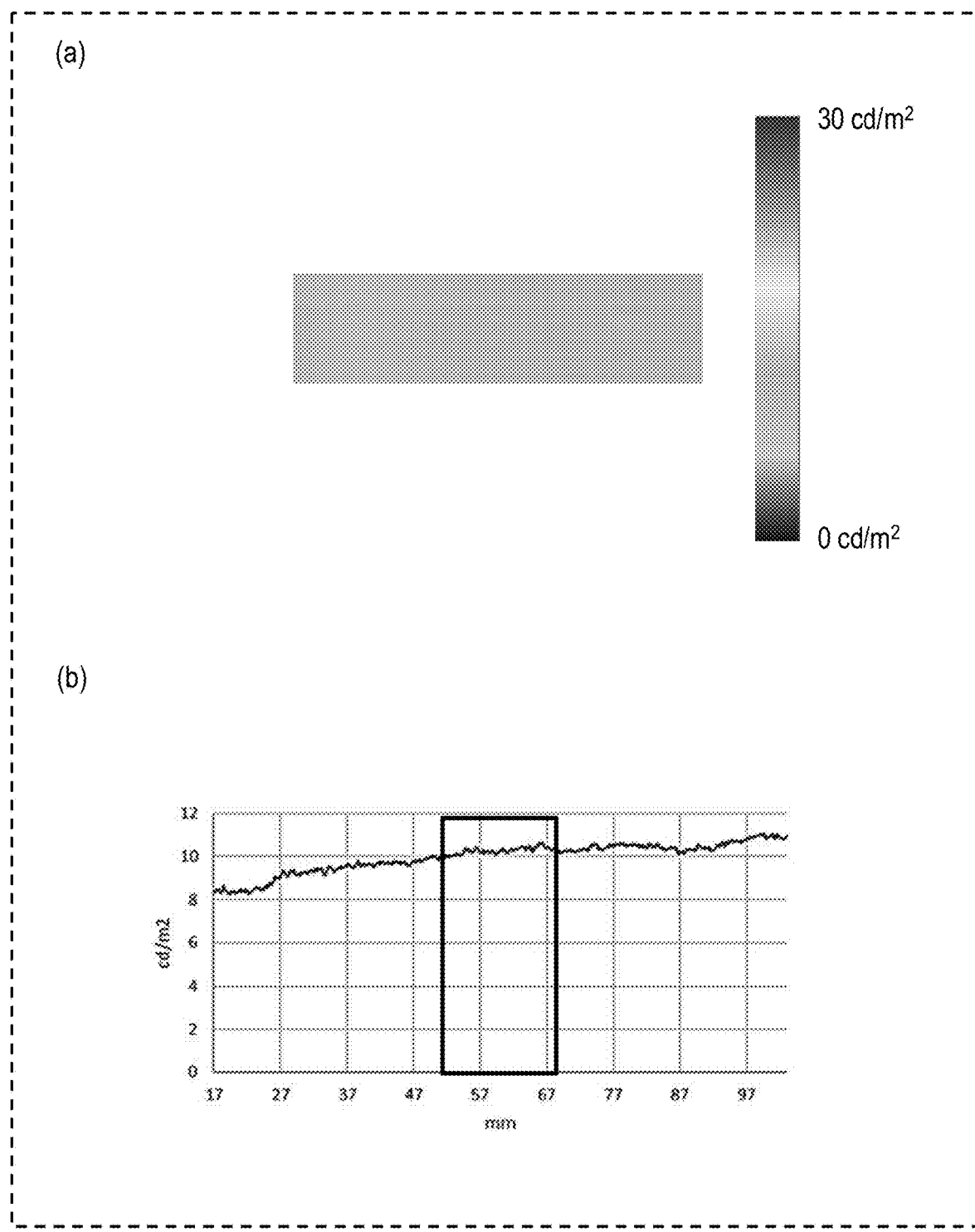
FIG. 6B A graph for an illumination device of Example 2 showing (a) a luminance distribution in a rectangular region that is located in the center of a rear face and (b) a relationship between: position on a horizon that passes through the center of the rectangular region; and luminance.
Figure 6C:
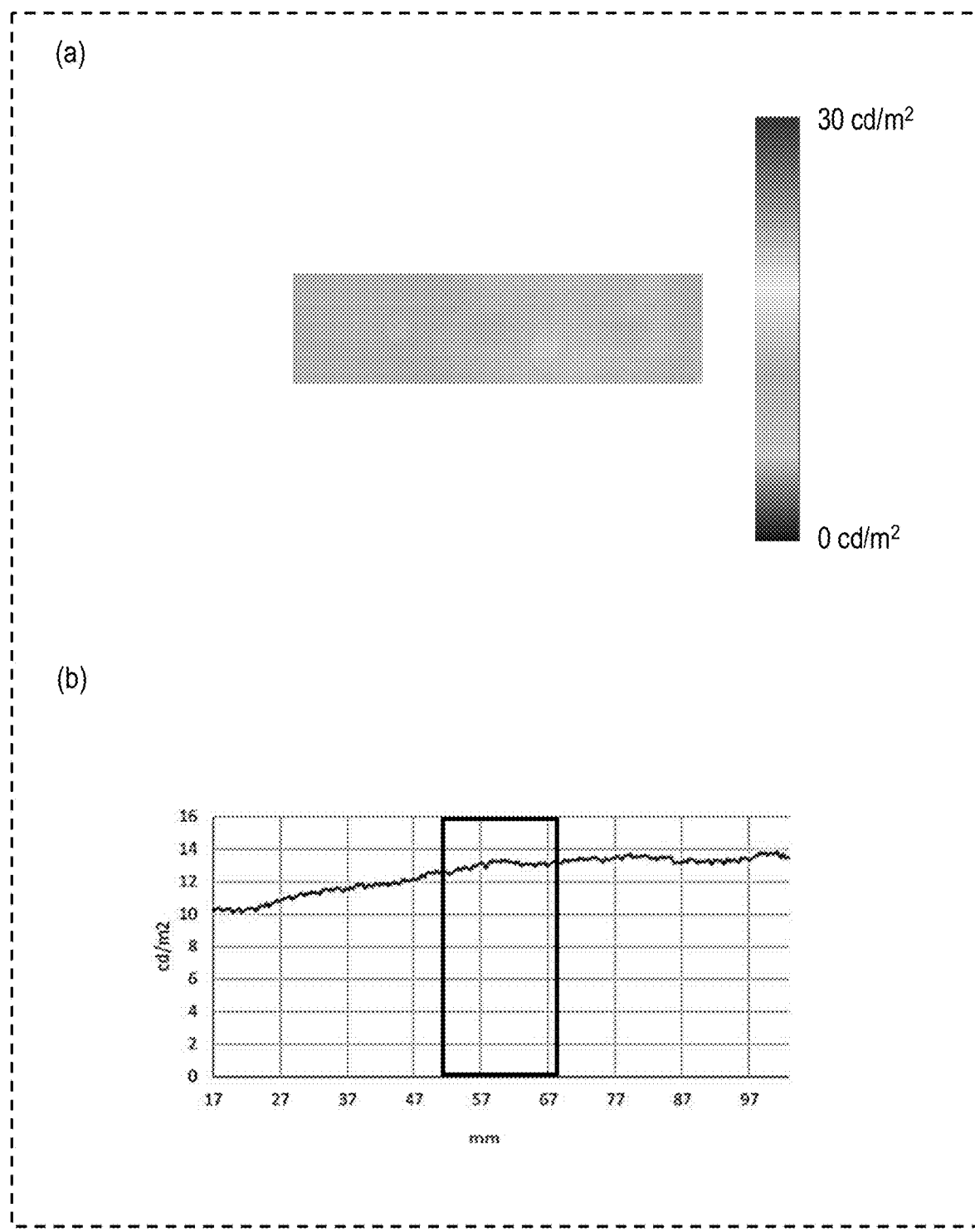
FIG. 6C A graph for an illumination device of Example 3 showing (a) a luminance distribution in a rectangular region that is located in the center of a rear face and (b) a relationship between: position on a horizon that passes through the center of the rectangular region; and luminance.
Figure 6D:
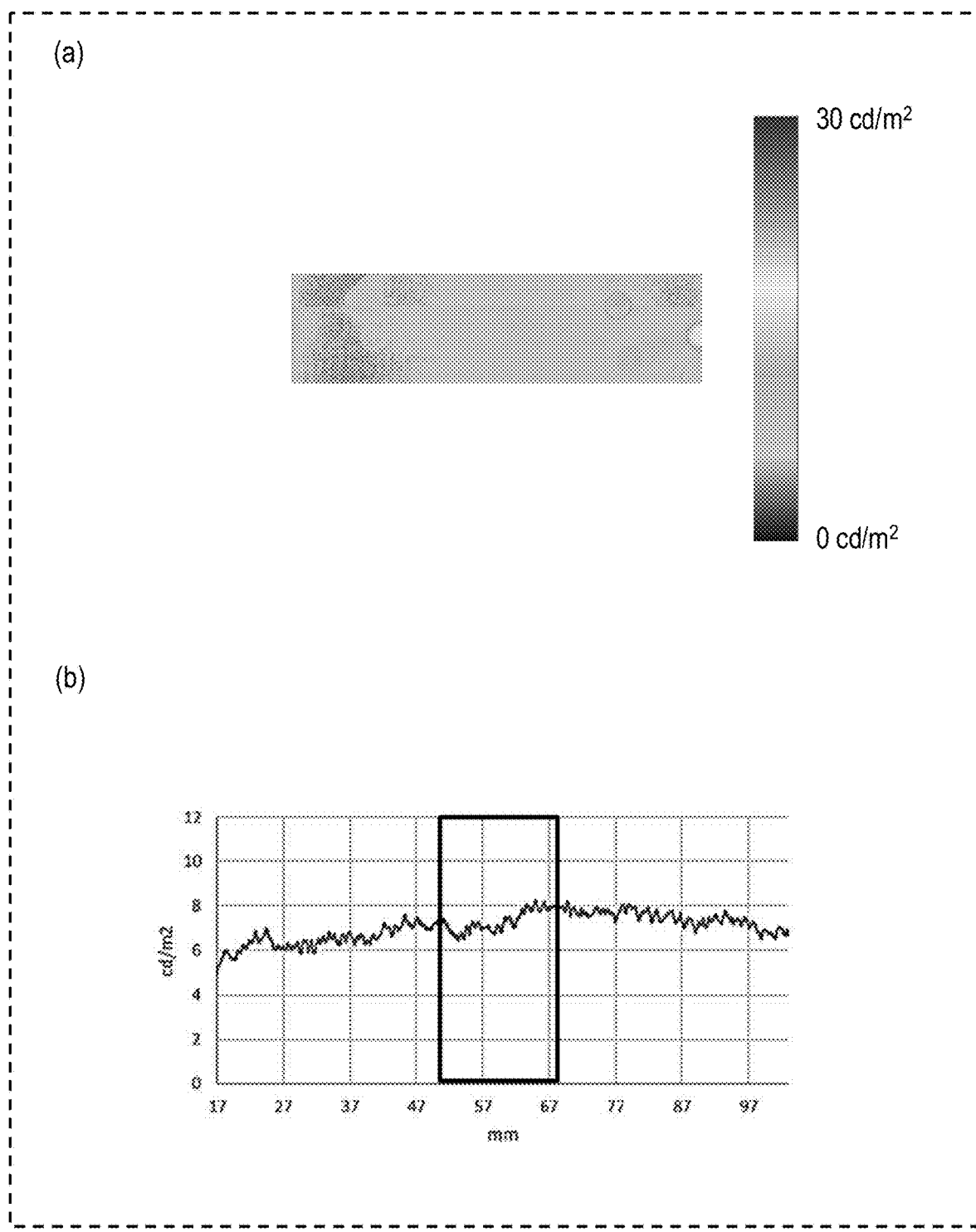
FIG. 6D A graph for an illumination device of Example 4 showing (a) a luminance distribution in a rectangular region that is located in the center of a rear face and (b) a relationship between: position on a horizon that passes through the center of the rectangular region; and luminance.
Figure 6E:
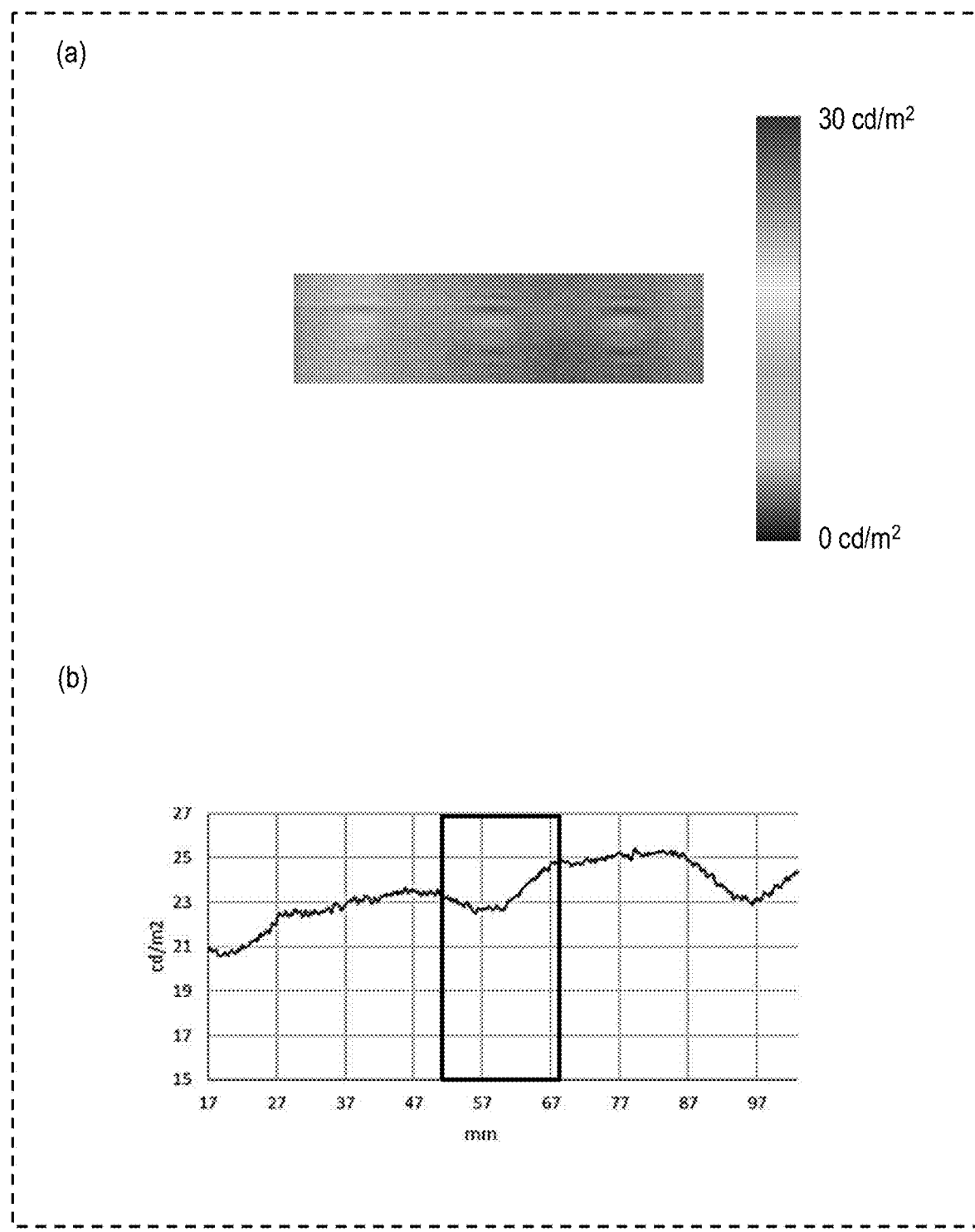
FIG. 6E A graph for an illumination device of Comparative Example 1 showing (a) a luminance distribution in a rectangular region that is located in the center of a rear face and (b) a relationship between: position on a horizon that passes through the center of the rectangular region; and luminance.
Figure 6F:
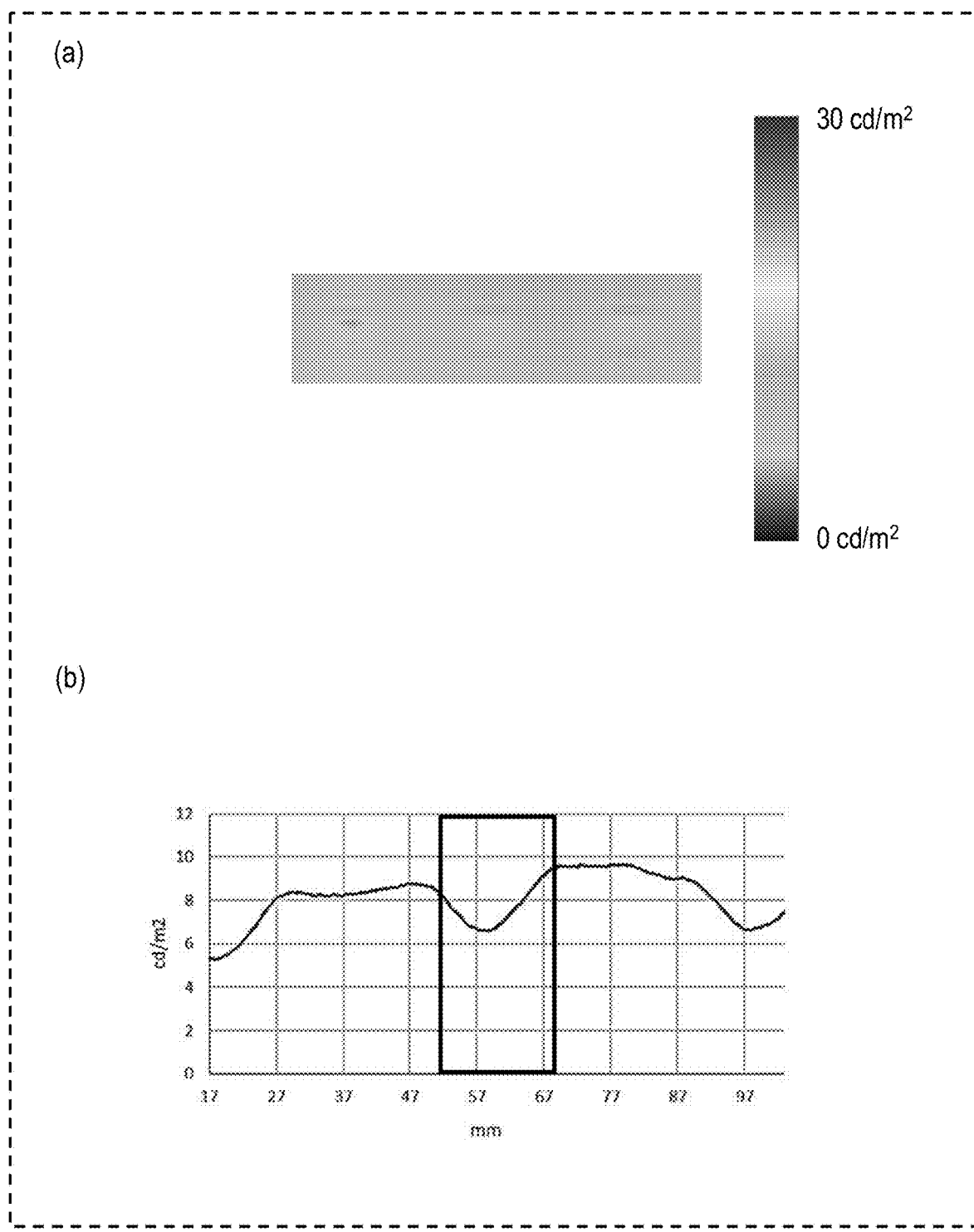
FIG. 6F A graph for an illumination device of Reference Example showing (a) a luminance distribution in a rectangular region that is located in the center of a rear face and (b) a relationship between: position on a horizon that passes through the center of the rectangular region; and luminance.

On the other hand, as shown in (a) of FIG. 6E and FIG. 6F, ghosting occurred when the illumination devices of Comparative Example 1 and Reference Example were viewed from the rear face. As shown in (b) of FIG. 6A to FIG. 6D, luminance considerably oscillated with position.

Table 6 shows, with respect to the illumination devices of Examples 1 to 4, Comparative Example 1 and Reference Example, a maximum contrast ratio in luminance at a specific portion of the rear face and the presence or absence of ghosting. The luminance at a specific portion on the rear face is a luminance in a portion of a horizon that passes through the center of the aforementioned rectangular region, the portion having a length 17.3 mm and being symmetric with respect to the center (see a region surrounded by a bold line in (b) of FIG. 6A to FIG. 6F).

TABLE 6

|  | Example 1 | Example 2 | Example 3 | Example 4 | Comparative Example 1 | Reference Example |
|---|---|---|---|---|---|---|
| maximum contrast ratio in luminance | 1.06 | 1.07 | 1.07 | 1.09 | 1.11 | 1.45 |
| ghosting | NO | NO | NO | NO | YES | YES |

In the illumination devices of Examples 1 to 4, which are free of ghosting, a maximum contrast ratio in luminance at a specific portion of the rear face was 1.1 or less.

Furthermore, the inventors have examined a maximum contrast ratio in luminance in a square region (17.3 mm) that is located at an arbitrary position in a region through which light leaks from the rear face of the illumination device. A "region through which light leaks" means a region of the rear face in which luminance is 70% or more of the highest luminance. In the illumination devices of Examples 1 to 4, which are free of ghosting, a maximum contrast ratio in luminance in the aforementioned square region located at an arbitrary position in a region through which light leaked from the rear face was 1.1 or less.

From the above, it can be seen that providing an anti-reflection layer and/or anti-glare layer at the first principal face side of the lightguide layer restrains ghosting from occurring when the illumination device is viewed from the rear face.

Next, with respect to the illumination devices of Examples 1 to 4 and Comparative Example 1, a mean roughness Ra and a maximum height Rz of the exit surface, a haze value, a visual reflectance Y (wavelength 550 nm), and the presence or absence of ghosting are shown in Table 7. During the production, some ruggednesses were formed on the exit surface even in the illumination devices of Examples 1 and 2 and the illumination device of Comparative Example 1 lacking an anti-glare layer.

TABLE 7

|  | Example 1 | Example 2 | Example 3 | Example 4 | Comparative Example 1 |
|---|---|---|---|---|---|
| Ra (μm) | 0.1 | 0.1 | 1.2 | 0.8 | 0.8 |
| Rz (μm) | 0.6 | 0.8 | 6.0 | 4.2 | 4.4 |
| haze value (%) | 0.3 | 0.2 | 3.2 | 2.8 | 4.9 |
| visual reflectance Y (%) | <0.1 | <1.0 | — | 1.5 | — |
| ghosting | NO | NO | NO | NO | YES |

In the illumination devices of Examples 1 to 4, the haze value was 4.0% or less, i.e., the illumination device was hardly cloudy. Furthermore, in the illumination devices of Examples 1 to 4, the visual reflectance Y was 2.0% or less, i.e., the illumination device had a high transparency.

Figure 7A:
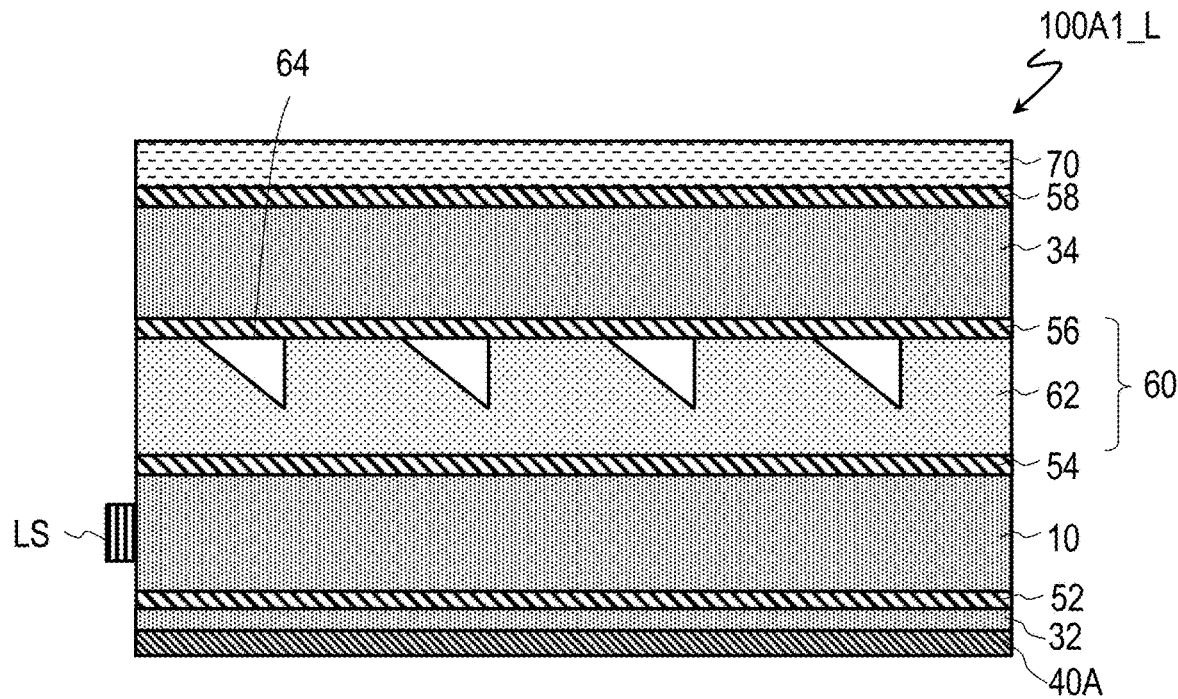
FIG. 7A A schematic cross-sectional view of another illumination device 100A1_L according to an embodiment of the present invention.
Figure 7B:
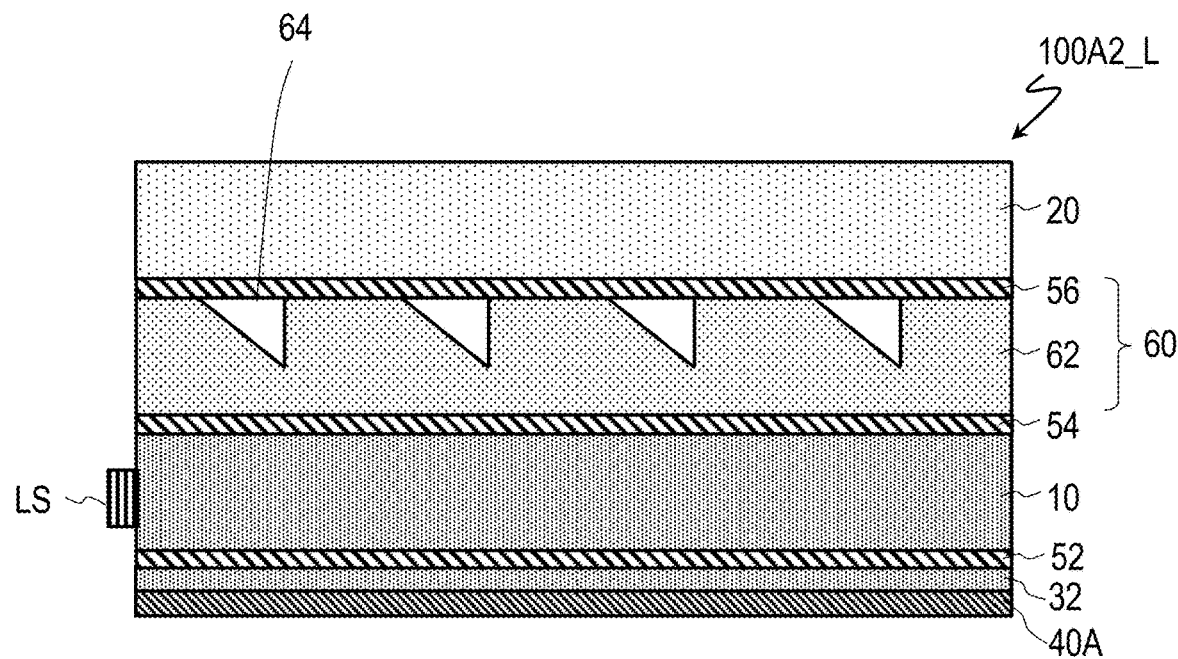
FIG. 7B A schematic cross-sectional view of still another illumination device 100A2_L according to an embodiment of the present invention.
Figure 7C:
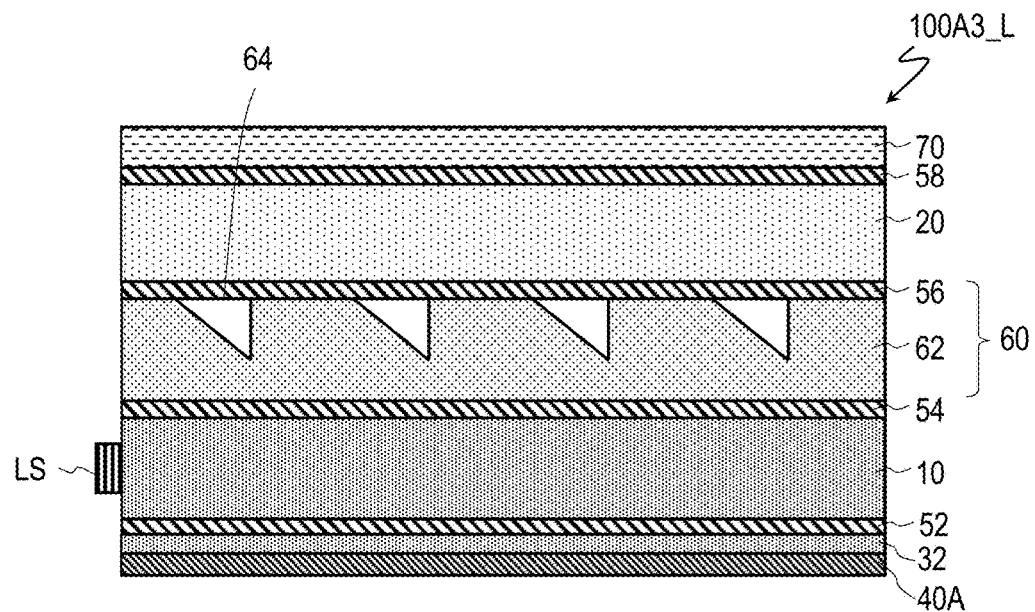
FIG. 7C A schematic cross-sectional view of still another illumination device 100A3_L according to an embodiment of the present invention.

The illumination devices according to embodiments of the present invention are not limited to the above examples, but may be modified in various manners. FIG. 7A, FIG. 7B and FIG. 7C show examples of illumination devices having a light distribution controlling structure similar to that of the illumination device 100A_L shown in FIG. 1.

An illumination device 100A1_L shown in FIG. 7A differs from the illumination device 100A_L shown in FIG. 1 in that the hard coat layer 70 is disposed on the base layer 34 via an adhesive layer 58. The pencil hardness of the hard coat layer 70 may be e.g. H or higher. The hard coat layer 70 is able to improve the scratch resistance on the surface of the illumination device 100A1_L.

An illumination device 100A2_L shown in FIG. 7B differs from the illumination device 100A_L shown in FIG. 1 in that a low-refractive index layer 20 is disposed instead of the base layer 34. In the illumination device 100A_L shown in FIG. 1, light which is emitted from the light source LS passes through the textured film 62 without going through the internal space 64 and which heads toward the base layer 34 undergoes total internal reflection at the interface between the base layer 34 and air, thus being directed toward the exit surface. If the upper face of the base layer 34 is dirty, total internal reflection may not occur at the portion where dirt has adhered. This may result in problems such as light leaking from the portion where dirt has adhered and/or changes in the distribution of light propagating in the lightguide component. On the other hand, in the illumination device 100A2_L shown in FIG. 7B, the interface between the textured film 62 and the low-refractive index layer 20 serves as an interface that is capable of causing a total internal reflection of light propagating in the textured film 62. The "interface between textured film 62 and the low-refractive index layer 20" means the interface between the textured film 62 and the adhesive layer 56, the interface between the low-refractive index layer 20 and the adhesive layer 56, and/or any region between both interfaces. Light propagating in the textured film 62 is not affected by the state of the interface between the low-refractive index layer 20 and air. Therefore, the low-refractive index layer 20 is able to improve the soil resistance at the surface of the illumination device 100A2_L.

An illumination device 100A3_L shown in FIG. 7C differs from the illumination device 100A2_L shown in FIG. 7B in that the hard coat layer 70 is disposed on the low-refractive index layer 20 via an adhesive layer 58. The hard coat layer 70 and the low-refractive index layer 20 can improve the scratch resistance and soil resistance, respectively, on the surface of the illumination device 100A2_L.

The hard coat layer 70 and the low-refractive index layer 20 can be formed by a known method by using a known material. These are also true of the illumination device 100B_L according to another embodiment of the present invention and the illumination device 100C_L according to still another embodiment of the present invention.

Preferable examples of the respective component elements of an illumination device according to an embodiment of the present invention will be described.

The textured film for creating the internal spaces may be produced as follows, for example. A concavo-convex textured film was produced according to a method described in Japanese National Phase PCT Laid-Open Publication No. 2013-524288. Specifically, the surface of a polymethyl methacrylate (PMMA) film was coated with a lacquer (manufactured by Sanyo Chemical Co., FINECURE RM-64); an optical pattern was embossed on the film surface including the lacquer; and thereafter the lacquer was cured to produce the concavo-convex textured film of interest. The concavo-convex textured film had a total thickness of 130 µm, and a haze of 0.8%.

The lightguide layer 10 is made of a known material having a high transmittance with respect to visible light. The lightguide layer 10 is made of an acrylic resin such as polymethyl methacrylate (PMMA), a polycarbonate (PC)-based resin, a cycloolefin-based resin, or glass (e.g., quartz glass, non-alkaline glass, borosilicate glass), for example. The refractive index $n_{GP}$ of the lightguide layer 10 is e.g. not less than 1.40 and not more than 1.80. The thickness of the lightguide layer 10 can be appropriately set depending on the application. The thickness of the lightguide layer 10 is e.g. not less than 0.05 mm and not more than 50 mm.

The base layers 32 and 34 have a thickness of e.g. not less than 1 µm and not more than 1000 µm, preferably not less than 10 µm and not more than 100 µm, and still more preferably not less than 20 µm and 80 µm. The base layers 32 and 34 each independently have a refractive index of preferably not less than 1.40 and not more than 1.70, and still more preferably not less than 1.43 and not more than 1.65.

The adhesive layers 52, 54, 56 and 58 each independently have a thickness of e.g. not less than 0.1 µm and not more than 100 µm, preferably not less than 0.3 µm and not more than 100 µm, and still more preferably not less than 0.5 µm and not more than 50 µm. The adhesive layers 52, 54, 56 and 58 each independently have a refractive index of preferably not less than 1.42 and not more than 1.60, and more preferably not less than 1.47 and not more than 1.58. The refractive indices of the adhesive layers 52, 54, 56 and 58 are preferably close to the refractive index of the lightguide layer 10 or the textured film 62 which they are in contact with, and preferably the absolute value of the refractive index difference is 0.2 or less.

Preferably, the adhesive layer 56 is able to achieve bonding without burying the recesses 64 in the surface of the textured film 62. As an adhesive that is suitable for the formation of the adhesive layer 56, adhesives that are described in International Publication No. 2021/167090, International Publication No. 2021/167091, or International Application PCT/JP2022/004554 by the Applicant can be suitably used. The entire disclosure of these applications is incorporated herein by reference. Particularly preferable is the polyester-based adhesive described in International Application PCT/JP2022/004554.

The anti-reflection layer 40A may be a single low-refractive index layer, but is preferably an alternating stack of high-refractive index layers and low-refractive index layers. The high-refractive index layers may have a refractive index of 1.9 or more, and preferably 2.0 or more, for example. Examples of high-refractive index materials include titanium oxide, niobium oxide, zirconium oxide, tantalum oxide, zinc oxide, indium oxide, indium tin oxide (ITO), and antimony-doped tin oxide (ATO). Among them, titanium oxide or niobium oxide is preferable. The low-refractive index layers have a reflective index of 1.6 or less, and preferably 1.5 or less, for example. Examples of low-refractive index materials include silicon oxide, titanium nitride, magnesium fluoride, barium fluoride, calcium fluoride, hafnium fluoride, and lanthanum fluoride. Among others, silicon oxide is preferable. It is particularly preferable to alternately stack niobium oxide ($Nb_2O_5$) thin films as high-refractive index layers and silicon oxide ($SiO_2$) thin films as low-refractive index layers. In addition to low-refractive index layers and high-refractive index layers, medium-refractive index layers with refractive indices of approximately 1.6 to 1.9 may be provided.

The film thickness of each high-refractive index layer and each low-refractive index layer is approximately not less than 5 nm and not more than 200 nm, and preferably approximately not less than 15 nm and not more than 150 nm. Depending on the refractive index, the stack configuration, or the like, the film thickness of each layer may be designed so as to reduce reflectance for visible light.

The anti-reflection layer 40A is preferably layered onto the hard coat layer (s) via a primer layer. Examples of materials to compose the primer layer(s) include metals such as silicon, nickel, chromium, tin, gold, silver, platinum, zinc, titanium, tungsten, aluminum, zirconium, and palladium; alloys of such metals; and oxides, fluorides, sulfides or nitrides of such metals. Among others, the material of the primer layer(s) is preferably an oxide, and especially preferably silicon oxide. The primer layer(s) is preferably an inorganic oxide layer (s) having less oxygen than in the stoichiometric composition. Among inorganic oxides of non-stoichiometric compositions, a silicon oxide which is expressed by the composition formula $SiO_x$ ($0.5 \leq x < 2$) is preferable. The thickness of the primer layer (s) is e.g. approximately not less than 1 nm and not more than 20 nm, and preferably not less than 3 nm and not more than 15 nm.

There is no limitation as to the method of forming the thin film(s) composing the anti-reflection layer 40A, and either a wet coating method or a dry coating method can be used. Dry coating methods such as vacuum evaporation, CVD, sputtering, and electron beam vapor deposition are preferable because these can form a thin film with a uniform film thickness. Among others, sputtering techniques are preferable because they can form a film which excels in film thickness uniformity and which is dense in texture. For example, an anti-reflection layer described in Japanese Laid-Open Patent Publication No. 2020-52221 can be suitably used. The entire disclosure of Japanese Laid-Open Patent Publication No. 2020-52221 is incorporated herein by reference.

Note that the anti-reflection layer 40A may not include a single low-refractive index layer or an alternating stack of high-refractive index layers and low-refractive index layers as aforementioned. The anti-reflection layer 40A may have a so-called moth-eye structure. Alternatively, the anti-reflection layer 40A may be made of a material having voids, similarly to the low-refractive index layer 20 as described below.

The low-refractive index layer 20 each independently has a refractive index $n_{L1}$ of preferably e.g. 1.30 or less, more preferably 1.20 or less, and still more preferably 1.15 or less. The low-refractive index layer 20 are preferably a solid, preferably having a refractive index of e.g. 1.05 or more. The difference between the refractive index of the lightguide layer 10 and the refractive indices of the low-refractive index layer 20 is preferably 0.20 or more, more preferably 0.23 or more, and still more preferably 0.25 or more. A low-refractive index layer 20 having a refractive index of 1.30 or less can be formed by using a porous material, for example. The low-refractive index layer 20 each independently has a thickness of e.g. not less than 0.3 μm and not more than 5 μm.

When the low-refractive index layer is a porous material with internal voids, its porosity is preferably 35 volume % or more, more preferably 38 volume % or more, and especially preferably 40 volume % or more. Within such ranges, a low-refractive index layer having a particularly low refractive index can be formed. The upper limit of the porosity of the low-refractive index layer is e.g. 90 volume % or less, and preferably 75 volume % or less. Within such ranges, a low-refractive index layer with good strength can be formed. The porosity is a value that is calculated according to Lorentz-Lorenz's formula from a value of the refractive index measured with an ellipsometer.

As the low-refractive index layer, for example, a low-refractive index layer with voids as disclosed in Patent Document 3 can be used. The entire disclosure of Patent Document 3 is incorporated herein by reference. Specifically, low-refractive index layers with voids include: essentially spherical particles such as silica particles, silica particles having micropores, and silica hollow nanoparticles; fibrous particles such as cellulose nanofibers, alumina nanofibers, and silica nanofibers; and flat-plate particles such as nanoclay composed of bentonite. In one embodiment, the low-refractive index layer with voids is a porous material composed of particles (e.g., micropored particles) that are chemically bonded directly to one another. The particles composing the low-refractive index layer with voids may be at least partially bonded to one another via a small amount (e.g., less than the mass of the particles) of a binder component. The porosity and refractive index of the low-refractive index layer can be adjusted based on the particle size, particle size distribution, and the like of the particles composing the low-refractive index layer.

Examples of methods of obtaining a low-refractive index layer with voids include methods that are described in Japanese Laid-Open Patent Publication No. 2010-189212, Japanese Laid-Open Patent Publication No. 2008-040171, Japanese Laid-Open Patent Publication No. 2006-011175, International Publication No. 2004/113966, and references thereof. The entire disclosure of Japanese Laid-Open Patent Publication No. 2010-189212, Japanese Laid-Open Patent Publication No. 2008-040171, Japanese Laid-Open Patent Publication No. 2006-011175, International Publication No. 2004/113966 is incorporated herein by reference.

As the low-refractive index layer with voids, porous silica can be suitably used. Porous silica can be produced by the following method, for example: a method involving hydrolyzing and polycondensing at least one of silicon compounds, hydrolyzable silanes and/or silsesquioxanes, and their partial hydrolysates and dehydration-condensation products; a method that uses porous particles and/or hollow microparticles; and a method that generates an aerogel layer using the springback phenomenon, a method of pulverizing a gelatinous silicon compound obtained by sol-gel processing and using a pulverized gel in which micropored particles as the resultant pulverized body are chemically bonded to one another with a catalyst or the like; and so on. However, the low-refractive index layer is not limited to porous silica, and the production method is not limited to the exemplified production methods; any production method may be used for production. However, the porous layer is not limited to porous silica, and the production method is not limited to the exemplified production methods; any production method may be used for production. Silsesquioxane is a silicon compound with ($RSiO_{1.5}$; where R is a hydrocarbon group) as the basic structural unit. Although silsesquioxane is not exactly the same as silica, whose basic structural unit is $SiO_2$, it has a network structure cross-linked by siloxane bonds, similarly to silica. Therefore, any porous material that contains silsesquioxane as its basic structural unit is also referred to as porous silica or silica-based porous material.

Porous silica may be composed of micropored particles of a gelatinous silicon compound that are bonded to one another. An example of micropored particles of a gelatinous silicon compound is a pulverized body of the gelatinous silicon compound. Porous silica may be formed by coating a base with a coating solution that contains a pulverized body of a gelatinous silicon compound, for example. The pulverized body of the gelatinous silicon compound may chemically bonded (e.g., siloxane bonded) through catalytic action, light irradiation, heating, or the like, for example.

The hardness $H_{H1}$ of the hard coat layer 70 is preferably e.g. pencil hardness H or higher, still more preferably 2H or higher, and more preferably 4H or higher. On the other hand, although there is no limitation as to the upper limit of the hardness $H_{H1}$ of the hard coat layer 70, it is preferably pencil hardness 6H or lower, and more preferably 5H or lower. The pencil hardness is measure by a method that complies with the "pencil hardness test" under JIS K 5400. The hard coat layer 70 each independently has a thickness of preferably not less than 1 μm and not more than 30 μm, more preferably not less than 2 μm and not more than 20 μm, and still more preferably not less than 3 μm and not more than μm. When the thickness of the hard coat layer 70 is in such ranges, good scratch resistance is provided.

So long as the aforementioned properties are attained, the hard coat layer 70 may be made of any appropriate material. The hard coat layer 70 is a cured layer of a thermosetting resin or an ionizing radiation (e.g., visible light or ultraviolet)-curable resin, for example. Examples of such curable resins include acrylates such as urethane (meth)acrylate, polyester (meth)acrylate, and epoxy (meth)acrylate, silicone resins such as polysiloxane, unsaturated polyesters, and epoxy resins. The hard coat layer 70 can be formed by coating the base surface of interest with a material containing a solvent and a curable compound, for example, and curing it. Details of a hard coat layer that is suitably used as the hard coat layer 70 is described in Japanese Laid-Open Patent Publication No. 2011-237789, for example. The entire disclosure of Japanese Laid-Open Patent Publication No. 2011-237789 is incorporated herein by reference.

INDUSTRIAL APPLICABILITY

A lightguide component for illumination devices and an illumination device according to an embodiment of the present invention can emit light through one of two principal faces that are oriented in opposite directions from each other, and appear transparent when seen through the other principal face. A lightguide component for illumination devices and an illumination device according to an embodiment of the present invention can provide novel applications that possess both practicality and design.

REFERENCE SIGNS LIST

10: lightguide layer, 20: low-refractive index layer, 32, 34: base layer, 40A: anti-reflection layer, 40B: anti-glare layer, 52, 54, 56, 58: adhesive layer, 60: redirection layer, 62: textured film, 64: internal space, recess, 70: hard coat layer, 100A, 100B, 100C, 900: lightguide component for illumination devices, 100A_L, 100B_L, 100C_L, 900_L: illumination device, ISa: first slope, ISb: second slope, LR, LR1, LR2: light, LS: light source

The invention claimed is:

1. A lightguide component for illumination devices having an exit surface, the lightguide component comprising:
a lightguide layer having a light-receiving portion to receive light emitted from a light source, a first principal face at the exit surface side, and a second principal face at an opposite side from the first principal face;
a light distribution controlling structure having a plurality of internal spaces, each of the plurality of internal spaces including a first slope to direct a portion of light propagating in the lightguide layer toward the exit surface via total internal reflection, and a second slope at an opposite side from the first slope, wherein, when viewed from a normal direction of the first principal face of the lightguide layer, the first slope presents a curved surface that is convex toward the light source;
a redirection layer disposed via an adhesive layer at the first principal face side or the second principal face side of the lightguide layer, wherein the light distribution controlling structure is formed in the redirection layer; and
an anti-reflection layer and/or anti-glare layer disposed at the first principal face side of the lightguide layer.

2. The lightguide component for illumination devices of claim 1, wherein the plurality of internal spaces are disposed discretely along a light-guiding direction of the lightguide layer and along a direction that intersects the light-guiding direction.

3. The lightguide component for illumination devices of claim 1, comprising the anti-reflection layer disposed at the first principal face side of the lightguide layer, wherein
the anti-reflection layer includes a multilayer stack that is composed of a single dielectric layer having a lower refractive index than a refractive index of the lightguide layer or a plurality of dielectric layers of respectively different refractive indices.

4. The lightguide component for illumination devices of claim 1, comprising the anti-reflection layer disposed at the first principal face side of the lightguide layer, wherein
the anti-reflection layer has a moth-eye structure or is made of a material having voids.

5. The lightguide component for illumination devices of claim 1, comprising the anti-glare layer disposed at the first principal face side of the lightguide layer, wherein
a surface of the anti-glare layer at an opposite side from the lightguide layer has a mean roughness Ra of not less than 0.8 μm and not more than 1000 μm and a maximum height Rz of 0 μm and not more than 1000 μm.

6. The lightguide component for illumination devices of claim 1, wherein,
a sloping angle θa of the first slope is not less than 10° and not more than 70°; and
a sloping angle θb of the second slope is not less than 50° and not more than 100°.

7. The lightguide component for illumination devices of claim 1, wherein, when the lightguide component is viewed from the normal direction of the first principal face of the lightguide layer, a ratio of an area of the plurality of internal spaces to an area of the lightguide layer is 80% or less.

8. The lightguide component for illumination devices of claim 1, comprising a low-refractive index layer at the second principal face side of the lightguide layer, the low-refractive index layer having a lower refractive index than a refractive index of the lightguide layer.

9. The lightguide component for illumination devices of claim 1, wherein a maximum contrast ratio in luminance is 1.1 or less in a square region that is located at an arbitrary position in a region through which light leaks from a rear face that is disposed at the second principal face side of the lightguide component for illumination devices, one side of the square region being 17.3 mm.

10. The lightguide component for illumination devices of claim 1, wherein a visible light transmittance of 60% or more and a haze value of less than 30%.

11. An illumination device comprising:
the lightguide component for illumination devices of claim 1; and
a light source to emit light toward the light-receiving portion.

12. The illumination device of claim 11, wherein the light source includes a plurality of LED devices arranged along the light-receiving portion of the lightguide layer.

13. A lightguide component for illumination devices having an exit surface, the lightguide component comprising:
a lightguide layer having a light-receiving portion to receive light emitted from a light source, a first principal face at the exit surface side, and a second principal face at an opposite side from the first principal face;
a light distribution controlling structure having a plurality of internal spaces, each of the plurality of internal spaces including a first slope to direct a portion of light propagating in the lightguide layer toward the exit surface via total internal reflection, and a second slope at an opposite side from the first slope, wherein, when viewed from a normal direction of the first principal face of the lightguide layer, the first slope presents a curved surface that is convex toward the light source;
a redirection layer disposed at the first principal face side or the second principal face side of the lightguide layer, wherein the light distribution controlling structure is formed in the redirection layer and the redirection layer comprises a textured film; and an anti-reflection layer and/or anti-glare layer disposed at the first principal face side of the lightguide layer.

\* \* \* \* \*